(12) United States Patent
Fan et al.

(10) Patent No.: US 9,971,942 B2
(45) Date of Patent: *May 15, 2018

(54) OBJECT DETECTION IN CROWDED SCENES USING CONTEXT-DRIVEN LABEL PROPAGATION

(71) Applicant: International Business Machines Corporation, Armonk, NY (US)

(72) Inventors: Quanfu Fan, Somerville, MA (US); Jingjing Liu, Yorktown Heights, NY (US); Sharathchandra U. Pankanti, Darien, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/813,844

(22) Filed: Nov. 15, 2017

(65) Prior Publication Data

US 2018/0060673 A1    Mar. 1, 2018

Related U.S. Application Data

(63) Continuation of application No. 15/087,236, filed on Mar. 31, 2016.

(51) Int. Cl.
*G06K 9/00* (2006.01)
*G06K 9/62* (2006.01)

(52) U.S. Cl.
CPC ..... *G06K 9/00778* (2013.01); *G06K 9/00335* (2013.01); *G06K 9/6277* (2013.01)

(58) Field of Classification Search
CPC .......... G06K 9/00778; G06K 9/00335; G06K 9/6277
See application file for complete search history.

(56) References Cited

U.S. PATENT DOCUMENTS

| 8,031,922 B2 * | 10/2011 | Haimerl ................... G06K 9/32 345/419 |
| 9,470,792 B2 * | 10/2016 | Giger ...................... G01C 11/02 |
| 9,477,908 B2 | 10/2016 | Sigal et al. |
| 2015/0110388 A1 | 4/2015 | Eaton et al. |
| 2015/0199560 A1 | 7/2015 | Gokturk et al. |
| 2017/0286779 A1 | 10/2017 | Fan |

OTHER PUBLICATIONS

List of IBM Patents or Patent Applications Treated as Related; (Appendix P), Filed Feb. 6, 2018; 2 pages.

* cited by examiner

*Primary Examiner* — Shefali Goradia
(74) *Attorney, Agent, or Firm* — Cantor Colburn LLP; Yeen Tham

(57) ABSTRACT

A computer implemented method for detecting an object in a crowded scene utilizing an image capturing device. The method includes receiving an image of a predetermined area. From the image, the existence of selected portions as representing an entity of a selected class is determined. Each selected portion is assigned an initial confidence value that the selected portion is an entity representative of a selected class. Each selected portion is evaluated with each other to determine a context confidence value. The context confidence value and initial confidence value are utilized to determine which of the one or more selected portions are entities of a selected class.

1 Claim, 8 Drawing Sheets

OBJECT DETECTION IN CROWDED SCENES USING CONTEXT-DRIVEN LABEL PROPAGATION

DOMESTIC BENEFIT/NATIONAL STAGE INFORMATION

This application is a continuation of U.S. application Ser. No. 15/087,236 which was filed on Mar. 31, 2016. The entire disclosures of U.S. application Ser. No. 15/087,236 are incorporated herein by reference.

BACKGROUND

The present disclosure relates to image processing for detecting selected objects in an image, and more particularly to the utilization of context-driven label propagation to identify groups of selected objects in crowded and/or cluttered scenes.

The need to detect and/or identify selected objects such as people or vehicles in images is central to a wide range of applications such as video surveillance and autonomous driving. Object detection for individuals and vehicles has been utilized in a variety of systems, including, for example, computer vision, deformable part models (DPM), poselets and deep learning. Object detection is particularly challenging when the objects in a given scene are at least partially obstructed or unclear because of a cluttered background, or because of the large number of potential pose variations.

SUMMARY

In accordance with an embodiment, a method for detecting objects in a crowded scene is provided. The method includes receiving, using a processor system, image data representing objects in a predetermined area. The processor system makes an initial determination that selected portions of the image data represent one or more entities of a predetermined class of object. An initial confidence value of the selected portions of the image data is determined wherein the initial confidence value identifies likelihood that the selected portions of the image data represent one or more of a selected class of object. A context confidence value of the selected portions of the image data is determined wherein the context confidence value identifies a contextual relationship between the selected portions of the image data. The context confidence value and the initial confidence value are utilized to determine that one of the selected portions of the image data represents an entity representative of a selected class of object.

In accordance with a further embodiment, a computer program product for detecting an object representative of a predetermined class of object in a crowded scene wherein the computer program product includes a computer readable storage medium having program instructions embodied therewith, and wherein the computer readable storage medium is not a transitory signal. The program instructions are readable by a processing circuit to cause the processing circuit to perform a method. The method includes receiving image data representing objects in a predetermined area and making an initial determination that selected portions of the image data represent one or more entities of a selected class of object. The method further includes determining an initial confidence value of the selected portions of the image data wherein the initial confidence value identifies a likelihood that the selected portions of the image data represent one or more entities of a selected class of object and utilizing the context confidence value and the initial confidence value to determine that one of the selected portions of the image data represents an entity representative of a selected class of an object.

In another embodiment of the invention, an individual identification system for detecting objects in a crowded scene utilizing an image capturing device is provided. The system includes a processor in communication with one or more types of memory and wherein the processor is configured to receive image data representing objects of a predetermined area. The processor makes an initial determination that selected portions of the image data represent one or more entities of a predetermined class of object. An initial confidence value of the selected portions of the image data is determined by the processor wherein the initial confidence value identifies a likelihood that the selected portions of the image data represents one or more entities of a selected class of object. A context confidence value of the selected portions of the image data is also determined by the processor wherein the context confidence value identifies a contextual relationship between the selected portions of the image data. The context confidence value and initial confidence value are utilized to determine that one of the selected portions of the image data represents an entity representative of a selected class of object.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments of the present disclosure present a novel image detection system for recognizing an object which represents an entity of a predetermined class of objects in crowded scenes which includes identifying the object and its contextual relationship with individuals. In exemplary embodiments, methods and system for detecting objects such as individuals in an image are provided. The systems and methods also include determining an object's context and modeling interactions between other detected objects. In a crowded scene, people usually form groups where they interact with each other, both spatially and socially. A group of people, queuing, sitting or walking together, indicate spatial closeness and similar scales. There also exists strong social patterns in the group such as facing (i.e. two people face each other) and following (e.g. people stand or sit side by side). In exemplary embodiments, methods and systems for identifying contextual cues and creating models of individuals' interactions are provided to determine if an identified object in an image is representative of an individual.

Figure 1:
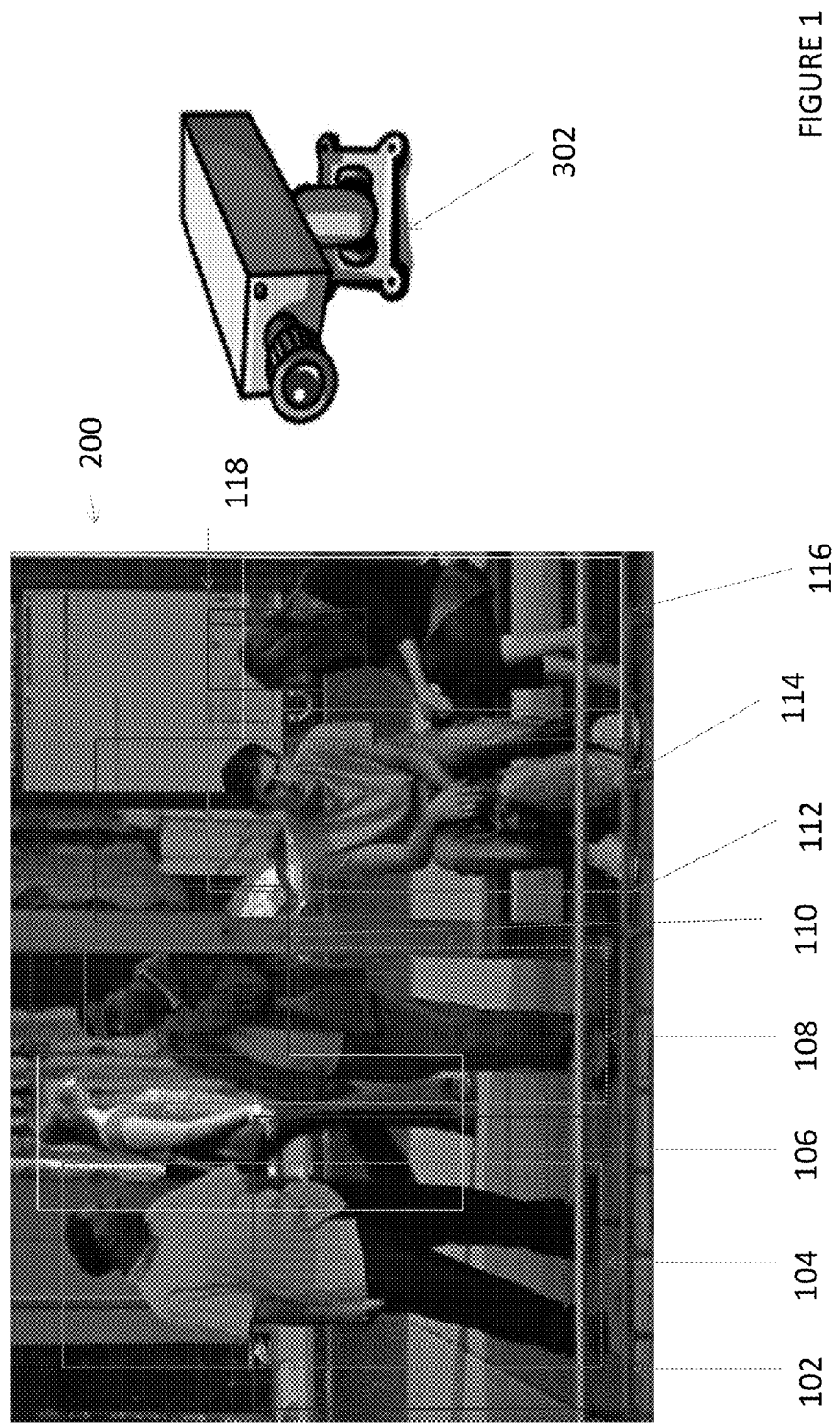
FIG. 1 illustrates the capturing of an image and processing for determining the presence of an object according to one or more embodiments of the present disclosure.
Figure 2:
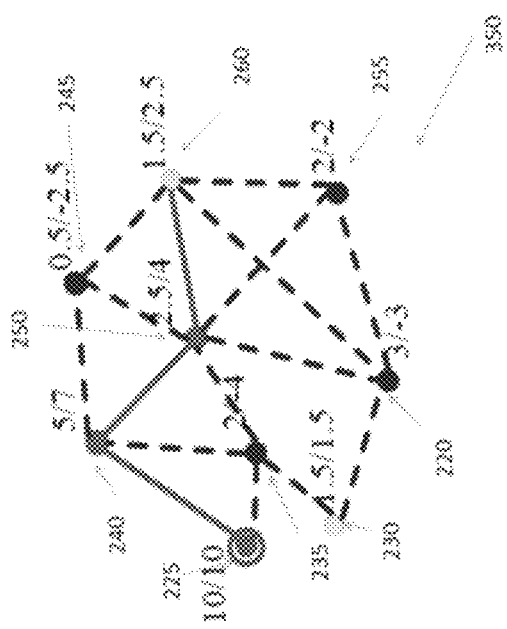
FIG. 2 illustrates the creation of a context graph via context label propagation according to one or more embodiments of the present disclosure.

Turning now to an overview of the present disclosure, one or more embodiments provide methods, systems and computer program products for detecting objects of a predetermined class in crowded scenes by using context driven label propagation are provided. In exemplary embodiments, an image of a predetermined area is taken by an image capturing device such as a camera or video recorder. Image data representing objects is received and selected portions of the image data are evaluated for making an initial determination that the selected portions represent one or more entities of a selected class of objects. The selected portions are evaluated utilizing imaging techniques which include recognition of common components of an object of a selected class. For instance, if the desired selected class includes an individual, then facial recognition and body recognition features would be analyzed. Such techniques include deformable part models (DPM), poselets and deep learning. An additional class of object maybe a vehicle wherein recognition of a vehicle body including tires would be analyzed. For the selected portions which meet a certain threshold of having recognizable features representing an entity representative of a selected class, an initial confidence value is determined. For instance, as shown in FIGS. 1 and 2, those entities which appear to possibly represent individuals are given a score ranging from 2 to 10. In this situation, the value of 10 is the highest confidence level that the image captured is indeed an individual based upon classic imaging processing techniques. However, due to certain images being unclear, the initial confidence value of certain selected portions of image data are lower. The threshold may vary depending on the particular environment involved. For instance, in an autonomous vehicle driving scenario, the inclusion of false positives is more beneficial than incorrectly not identifying an individual or another vehicle based upon an unclear image hence the threshold for identifying an identified object based on visual recognition is low. However, in a stadium setting where the occurrence of individuals is expected, the threshold for identifying an identified object based on visual recognition could be higher. The establishment of a baseline as described is based solely on visual recognition techniques. Such a technique removes stationary objects such as trash cans and the like, but may include an object such as a statue as a false positive.

With the establishment of a baseline, the method further includes evaluating the initial confidence score by comparing the selected portion of an image with additional selected portions of the image via contextual relationships. In the exemplary embodiment, the relative contextual relationships include spatial, scale, social, and overlap. These contextual relationships are each individually evaluated with respect to an attraction attribute or a repulsion attribute. Each contextual relationship with a respective selected portion of the image is evaluated with respect to additional selected portions within a predetermined range. For example, the scale context of a particular selected portion may be evaluated with respect to those selected portions within a ten foot area, or the social context may be evaluated with respect to those selected portions within a five foot area. Each relationship is aggregated to produce a context confidence value. If the context confidence value is greater than a predetermined threshold, then the initial confidence value that a selected portion is an entity representative of a selected class may be validated. If the context confidence value is less than a predetermined threshold, then the initial confidence value that an identified object is an entity of a representative class may be seen as a false positive.

The invention focuses on post image processing to determine the presence of an entity representative of a selected class based on contextual environmental clues where such objects would not have been considered an entity representative of a selected class from prior image processing techniques due to the quality of the initial image. An embodiment of the present invention further processes visual images for identifying an object representative of a class such as individuals via an image detector which when processed under known image processing techniques would fail to identify selected portions of an image as representing an individual. FIG. 1 illustrates a group of people in a social interaction setting as recorded by a surveillance camera. In this embodiment, the selected class of objects would include individuals. In other embodiments, the selected class of objects may include vehicles. As shown in FIG. 1, people are grouped with the two people on the left facing each other and two people on the right following or sitting side by side. Initial detections are identified as either high confidence or low confidence. As seen in FIG. 1, an initial processing of an image 200 taken by an image capturing device 302 such as a surveillance camera identifies several selected portions. Each selected portion is processed for determining the likelihood that the selected portion is an individual. As shown in FIG. 1, selected portions 102-118 are identified as potential individuals and assigned initial confidence values based upon image processing characteristics utilized for recognizing individuals such as facial and body recognition techniques which are known to those skilled in the art such as deformable part models (DPM), poselets and deep learning.

The relationship of the individuals is presented in a context graph illustrated in FIG. 2. A contextual analysis between the individuals is undertaken. A bold edge indicates a mutual attraction between two nodes, i.e. they are contextually compatible. Oppositely a dotted edge suggests an opposite relationship, i.e. repulsion. The framework applies label propagation to boost up weak detections while suppressing irrelevant false alarms.

As shown in FIG. 2, the context graph 350 captures the interaction strength between selected portions or detections. Each node in FIG. 2 represents a selected portion from FIG. 1. As shown in FIG. 1 and FIG. 2, the selected portion/node relationship is as follows:

| Selected Portion | Node |
| --- | --- |
| 102 | 220 |
| 104 | 225 |
| 106 | 230 |
| 108 | 240 |
| 110 | 235 |

-continued

| Selected Portion | Node |
|---|---|
| 112 | 245 |
| 114 | 250 |
| 116 | 255 |
| 118 | 260 |

A context graph that incorporates contextual information available from the scene is built. The contextual information can include spatial, scale, social, and overlap cues. This contextual information is utilized for label propagation. The label propagation framework which builds the context graph spreads both positive and negative contextual potentials along edges depending on contextual attraction or repulsion; as a result, contextually compatible selected portions representing entities representative of a selected class such as an individual gets reinforced by receiving positive potentials during the propagation while false alarms are contained due to being negated by their incompatibility with true detections. This approach is illustrated in FIG. 2 which illustrates an initial scene where true "labeled" data has yet been developed and the initial context graph includes greedy-like inferences which iteratively adds the best identified object with the most potential gain as a label at each time to initialize a new round of propagation. The process repeats until convergence when no new identified object can be labeled.

As seen in FIG. 2, in the exemplary embodiment, different selected portions may initially have an initial positive confidence value based upon a positive visual recognition. However, upon processing, the context confidence value may decrease this value. In this scenario the selected portion would be deemed a false alarm. However, in other scenarios, an initial identified object may have their initial confidence value increased or remain the same, in this scenario the initial confidence value identifying that the selected portion is an individual is validated.

As illustrated in FIG. 2, a respective selected portion is evaluated with respect to multiple surrounding selected portions in order to process the context graph. The Context Graph 350 illustrates the overall confidence that a selected portion is an individual. The selected portions from FIG. 1 are identified as nodes having a respective initial confidence value. By evaluating the contextual relationships of the selected portions, a context confidence value is established. These two metrics are combined to produce an overall confidence value that the selected portion is representative of an individual. The following table reflects the attributes identified in Context Graph 350.

| Node | Initial Confidence Value | Context Confidence Value | Overall Confidence |
|---|---|---|---|
| 220 | 3 | −6 | −3 |
| 225 | 10 | 0 | 10 |
| 230 | 1.5 | 0 | 1.5 |
| 235 | 2 | −6 | −4 |
| 240 | 5 | 2 | 7 |
| 245 | 5 | −3 | −2.5 |
| 250 | 2.5 | 1.5 | 4 |
| 255 | 2 | −4 | −2 |
| 260 | 1.5 | 1 | 2.5 |

The building of the contextual graph involves several steps. In an exemplary embodiment, given an image, let $X=\{x_i, i=1:m\}$ be a set of m selected portions generated by an underlying people detector such as visual recognition instructions. The detection threshold is variable and in some exemplary embodiments is purposely set to a low detection threshold to allow for more true detections in X, which unfortunately also gets many more undesirable false alarms. Therefore, the task is to find a subset of X that covers as many as possible true detections, meanwhile with the fewest false alarms brought in. Mathematically, an indicator vector is sought where $Y=\{y_1, y_2, \ldots, y_m\}T \in \{0, 1\}$ (1 means true people detection otherwise background) that maximizes a potential function $\Psi(X, Y)$, such that the visual detections agree on the contextual setting of the image. Equation 1 defines the potential function as follows:

$$\Psi(X, Y) = \sum_{i=1}^{m} y_i \psi^u(x_i) + \alpha \sum_{i=1}^{m} y_i \psi^c(x_i, X, Y)$$

where $\psi^u(\cdot)$ is the unary potential that utilizes the original detection score of a selected portion. $\psi^c(\cdot)$ represents the total contextual potentials of an object received from others. $\alpha$ is a constant number balancing these two terms. A model of the contextual interaction between any two selected portions is developed via a context graph G. Thus producing equation 2: $\psi^c(x_i, X, Y) \triangleq \psi^c(x_i, Y)$, where $\psi^G(x_i, X, Y)$ measures how much contextual potential identified object $x_i$ can be obtained from validated selected portions (reflected by Y) based on G.

A context graph is created that is an undirected graph G=(V,E) used for label propagation where V corresponds to a set of selected portions and E indicates the strength of contextual interactions between each pair of selected portions. While the focus is to reward selected portions which are contextually consistent to true detections, suppressing false alarms is equally important during label propagation as the input initially contains substantial errors. Accordingly, two types of strengths are considered; attraction e+ and a repulsion e− when constructing the contextual graph G. Attraction measures contextual compatibility between two identified entities while repulsion relates to contextual inconsistencies. In an exemplary embodiment, four types of contextual cues are utilized. These are namely scale, spatial, overlap and social of which their attraction strengths are denoted as e+ scale, e+ spatial, e+ overlap, and e+ social. Similarly three types of cues are utilized in evaluation repulsion. These include scale, spatial and overlap with their respective repulsion strengths denoted as e-scale, e-spatial and e-overlap.

The respective context features are mapped to a number between 0 and 1 to indicate the strength of the contextual interaction. Spatial context is explored by the image distance $d(x_i, x_j)$ between two selected portions. To eliminate the effects of image resolution and camera perspective, d (xi, xj) is further normalized as follows:

$$f_{sp}(x_i, x_j) = \frac{2d(x_i, x_j)}{(h_i, h_j)} \cdot \min\left(\frac{h_i}{h_j}, \frac{h_j}{h_i}\right)$$

where $h_i$ and $h_j$ are the image heights of the selected portions $x_i$ and $x_j$. The ratio $h_i/h_j$ compensates camera perspective as this ratio can reflect the depth change of the two selected portions. The minimum operation is utilized to obtain symmetric feature. The sum $h_i$ and $h_j$ further normalizes the distance into the unit of human height. Scale context is evaluated by the physical height ratio of two selected portions. Initially an estimate is made of the image location of a horizon line $v_o$. By assuming that all selected portions are all grounded and upright, the physical height of identified object $x_i$ is defined as follows:

$$\zeta_i = h_i \zeta_c / v_i - v_o$$

Where $h_i$ and $v_i$ encode the physical height and image locator of $x_i$ respectively. $\zeta_C$ is the camera height. Consequently, given any two detections, a value pair is obtained $(v_o(h_i-h_j), h_i v_j - d\, h_j v_i)$.

With multiple ($\geq 3$) strong detections (i.e. high confidence), $v_0$ can easily be estimated by least square fitting. The physical height ratio of two selected portions can then be defined as:

$$f_{sp}(x_i, x_j) = \min\left(\frac{h_i(v_j - v_o)}{h_j(v_i - v_o)}, \frac{h_j(v_i - v_o)}{h_i(v_j - v_o)}\right)$$

The minimum is used for feature symmetry. In operation, if the height of a standing selected portion is 1, a sitting identified object is regarded as 0.75 height.

Social context is an attribute which reflects social interactions between two detections measured in virtue of pose and body (or head) orientation. A pose classifier (standing or sitting) was designated as RBF-kernel SVM with 1200-dim poselet activation vector (PAV). The 2-dim probability output p of this classifier is then used to evaluate pose similarity. Body orientations indicate the position of co-existing true detections. In the exemplary embodiment, two orientation patterns are modeled, namely following and facing.

Figure 6:
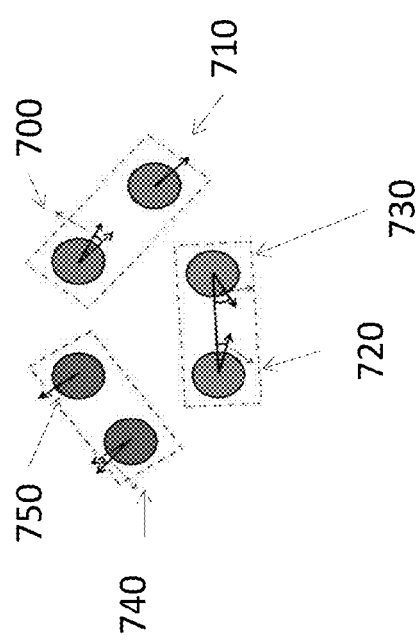
FIG. 6 is an illustration of a social context assessment in accordance with one or more embodiments of the present disclosure.

FIG. 6 illustrates the concepts of following and facing. A small $\angle \theta$, i.e. included angle of body orientations, indicates a following pattern, while $\angle \theta_1$ and $\angle \theta_2$ when both being small, exhibit a facing pattern. The strongest orientation pattern is used, thus producing $$f_{so} = \min(\angle\theta, \max(\angle\theta 1 \text{ and } \angle\theta 2)) * |p_1 - p_2|_2.$$

Overlap context utilizes the overlap ratio of two bounding boxes to express location compatibility of two selected portions, i.e., $f_{ov} = (B_i \cap B_j)/(B_i \cup B_j)$, where $B_i$ and $B_j$ are bounding boxes of $x_i$ and $x_j$, respectively. If the ratio is of a certain threshold, then it is determined that the selected portions are actually indicative of only one individual.

A data driven approach is utilized to learn a mapping function $F: f \rightarrow e$ for each of the contextual pattern, using 120 images from Structured Group Dataset SGD that are independent from the evaluation subset. Gaussian kernels are utilized to model mapping functions F. Parameters of these Gaussian functions are estimated by fitting the distributions of the respective context patterns. Spatial attraction $e_{sp}+$ is modeled as a 2-component Gaussian kernel, which corresponds to a maximum influence around 0.3 human height and vanishes after 1.5. $e_{sp}^- = 1$ when $F_{sp} < 0.1$. For $e_{sc}+$, a Gaussian function in the range of $|0, 0.8|$ is fit. To counteract height differences of individuals and mild errors of bounding boxes, $e_{sc}+$ is set to =1 when $F_{sc} \in |0.8, 1|$, $e_{ov}+$, $e_{ov}^-$, and $e_{so}+$ are done in a similar way.

The scale and overlap contexts are deductive patterns, i.e. they are discriminative to tell whether an identified object is true or not. For instance, if a identified object goes against true detections with regard to scale (small $e_{sc}+$), then a strong repulsion should be given (large $e_{sc}^-$). Thus $e_{sc}^- = 1 - e_{sc}+$ and $e_{ov}^- = 1 - e_{ov}+$. In opposite, spatial and social cues are not deductive as it cannot be inferred whether or not a hypotheses is invalid, even if it is remote from true detections or no social interactions are observed.

Given a context graph G, the contextual potential $\psi^G(x_i, Y)(i \in [1:m])$ is obtained. An initial potential vector $Z \in R^m$ is initialized as Y where $Y \in R^m$ for m selected portions. If the contextual potential of a selected portion $x_i$ is targeted $z_i$ is set to =0 to avoid self-reinforcement. Under such a setting, a selected portion $x_i$ is labeled when $y_i \neq 0$ and unlabeled otherwise. As aforementioned, strong true detections is more robust in propagating potential, therefore G is reweighted. Logistic regression is applied to normalize unary $\psi^u(x_j)(j \in [1:m])$ into $w_j \in (0,1)$ which can be regarded as the true detection probability of selected portion $x_j$; $w_j$ is set to =1 if $y_j = 1$, since $y_j = 1$ means validated true detection. Then each column of G is re-weighted by $w_j$, i.e., $G'_{.j} =_{wj} G_{.j}$. Matrix G' is further row-normalized such that $\overline{G}_{ij} = G_{ij}/\Sigma_k |G'_{ik}|$, which is critical for the convergence of the propagation algorithm. The potential propagation algorithm in Algorithm. 1 is as follows:

Algorithm 1 Potential Propagation for $\psi^G(x_i, Y)$
1: Input: given G, Y.
2: Output: $\psi^G(x_i, Y)$
3: Initialize Z=Y, $z_i=0$
4: Obtain $\overline{G}$ by re-weighting and row-normalization
5: while Z does not converge do
6: $Z \leftarrow \overline{G}Z$
7: Z=max (Z, 0)
8: $\forall_j \in [1:m], j \neq i$, if yj=1,zj=1,
9: end while
10: $\psi^G(x_i, Y) \leftarrow \overline{G}Z$ In line 6, potential is progagated based on $\overline{G}$ and the potential vector Z in previous iteration. In line 7, all negative elements are reset in potential vector Z back to zero in order to cut off the potential defused by false alarms as the identification of an object as an individual is a true detection or a false alarm. In line 8, elements are replenished with the initial value 1. The propagation algorithm repeats from line 6 to line 8 until Z coverages. One more propagation is executed in line 10, in order to output the $\psi^G(x_i, Y)$ with both positive and negative contextual potential.

Considering contextual potential $\psi^G(x_i, Y)$, optimizing the objective function in Equation 1 is NP hard. The proposed potential propagation algorithm is combined with a forward search, aiming at a sub-optimal $\hat{Y} = \max_y \psi(X,Y)$. Different from conventional graph-based propagation with fixed "labeled" instances, unconfirmed selected portions are progressively validated and propagate their potential in next run. Let $S^t = \{i | y_i = 1, i \in [1:m]\}$ denote the confirmed set of selected portions at t iteration. The potential change by instancing selected portions $x_i$ is defined as follows: $\Delta(x_i) = \Psi(X, Y(S^t \cup i)) - \Psi(X, Y(S^t)) = \psi^u(x_i) + \alpha(x_i, Y(S^t)) + \Sigma \psi^G(x_j, 1(i))$ where $\psi^u(x_i)$ is the unary potential: $\psi^G(x_i, Y(S^t))$ measures the contextual potential identified object $x_i$ obtains from instanced identified object in $S^t$; Y (St) is the label vector that $y_k = 1$, if $k \in S^t$ and 0 otherwise; $\Sigma j \in S^t \psi g(x_j, 1(i))$ represents potentials that identified object $x_j$ imposes onto instances(s) in $S^t$, where 1 (i) is an indicator vector with only ith element equals 1 and others are 0s. The progressive inference algorithm is as follows:

Algorithm 2 Progressive inference for $\hat{Y}, \hat{S}$
1: Input: given G, X.
2: Output: $\hat{Y}, \hat{S}$
3: Initialize Y=0 and $S^o = \emptyset$
4: First instance $i^* = \arg \max_i \psi^u(x_i)$, set $S^t = \{i^*\}$.
5: while $\Delta(x_i) > 0$ do
6: $\forall i \in [1:m]$, $y_i \neq 1$, $i^* = \arg \max_i \Delta(x_i)$(Alg.1)
7: Update Y: $y_i^* = 1$ $i^*$ 8: $S^{t+1} \leftarrow S^t \cup$
9: $t+1 \leftarrow t$
10: end while
11: $\hat{Y}, \leftarrow Y, \hat{S} \leftarrow S^t$ The progressive inference algorithm starts with an empty set S and a zero vector Y. The first selected portion is selected according to unary potential only. During each iteration, one unconfirmed selected portion is evaluated with the largest potential change $\Delta(x_i)$ and updates $S^t$ and Y accordingly. Algorithm 2 runs line 6 to 9 repetitively and instance one selected portion in each iteration, until adding any other detections could not enhance the total potential $\psi$ (X, Y). Obviously, by growing $S^t$ alternatively, contextual potentials from true detections are progressively propagated. When the algorithm ceases, the selected portions in $\hat{S}$ are regarded as true detections while others are declared false alarms. All detections are summed by their unary and contextual potentials, i.e., $$\psi'(x_i) = \psi^u(x_i) + \alpha \left( \psi G(xi, \hat{Y},) + \left( \sum_{j \in St} \psi G(xj, 1(i)) \right) \right)$$

where $\psi(x_i)$ could be positive or negative. After rescoring, value 0 is further used as the cutoff threshold to differentiate true detections and false alarms.

Figure 3:
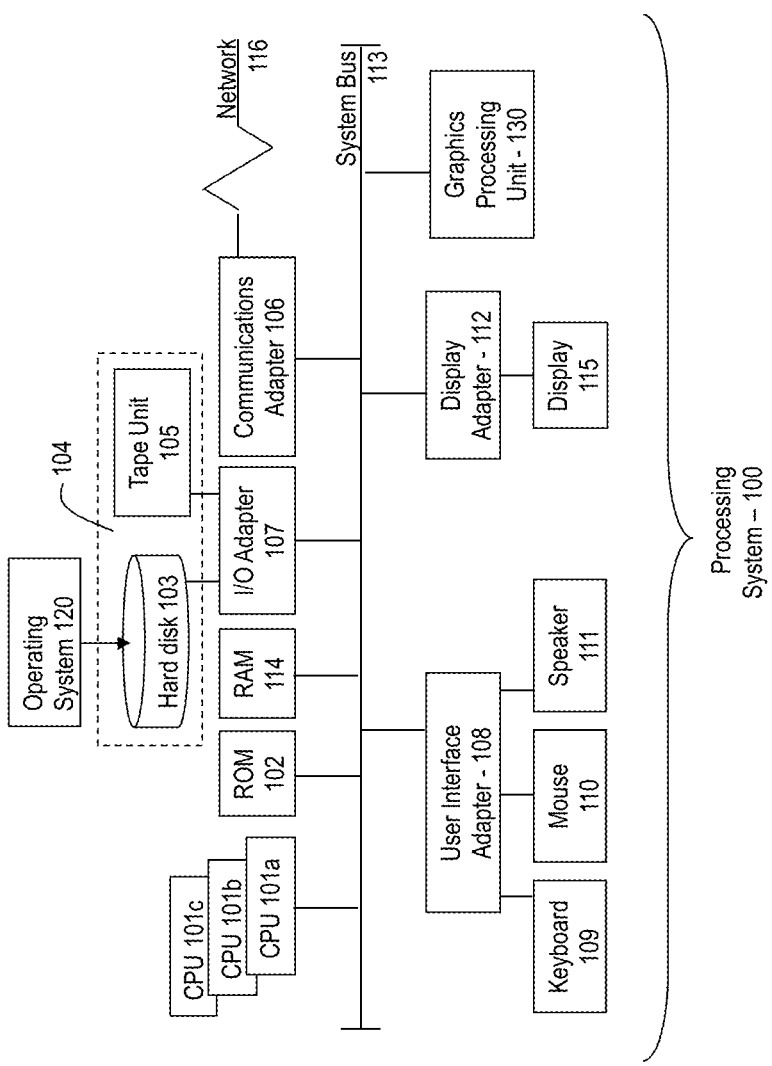
FIG. 3 is a block diagram illustrating one example of a processing system according to one or more embodiments of the present disclosure.

Referring to FIG. 3, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 3 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 3, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 3.

Figure 4:
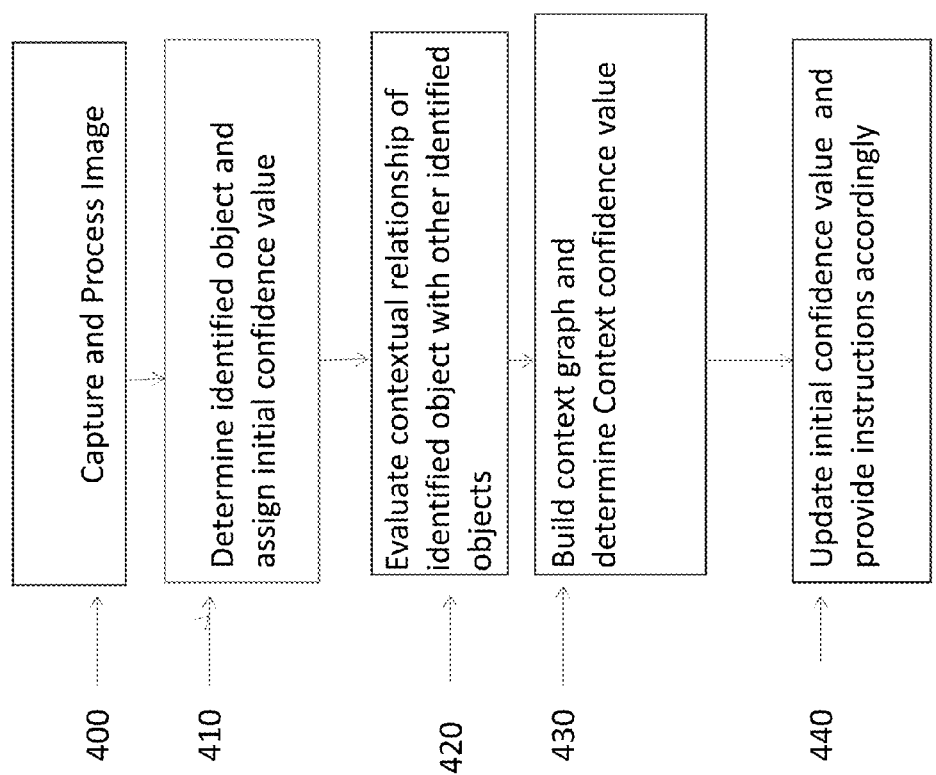
FIG. 4 is a flow diagram of a method of detecting objects in a crowded scene in accordance with one or more embodiments of the present disclosure.

As seen in FIG. 4, in the exemplary method, an image is captured and processed at block 400. Once captured, the image is processed by a processor utilizing visual recognition parameters to determine if a selected portion is potentially representative of an entity of a predetermined class of an object. The class may include a vehicle or an individual or any object which may be classified via image processing. In the embodiment shown in FIG. 4, an individual is the entity which is being evaluated. The selected portions are each evaluated to determine if they potentially represent an individual and are assigned an initial confidence value, as shown at block 410. If the selected portion has an initial confidence value greater than a threshold, then the selected portion is evaluated with respect to contextual relationships with other selected portions, as shown at block 420. Next, as shown at block 430, based upon the contextual relationships, a context graph is built and a context confidence value is established for each selected portion. As shown at block 440, the selected portion's initial confidence value is updated with the context confidence value and instructions are provided accordingly. For instance, if the scenario involves an autonomous vehicle, then the instructions may require that the vehicle stop, change paths, slow down, or continue on. If the scenario involves a security surveillance setting, then the future actions may include further surveillance, the manipulation of a camera or the dispatching of officials to the area.

Figure 5:
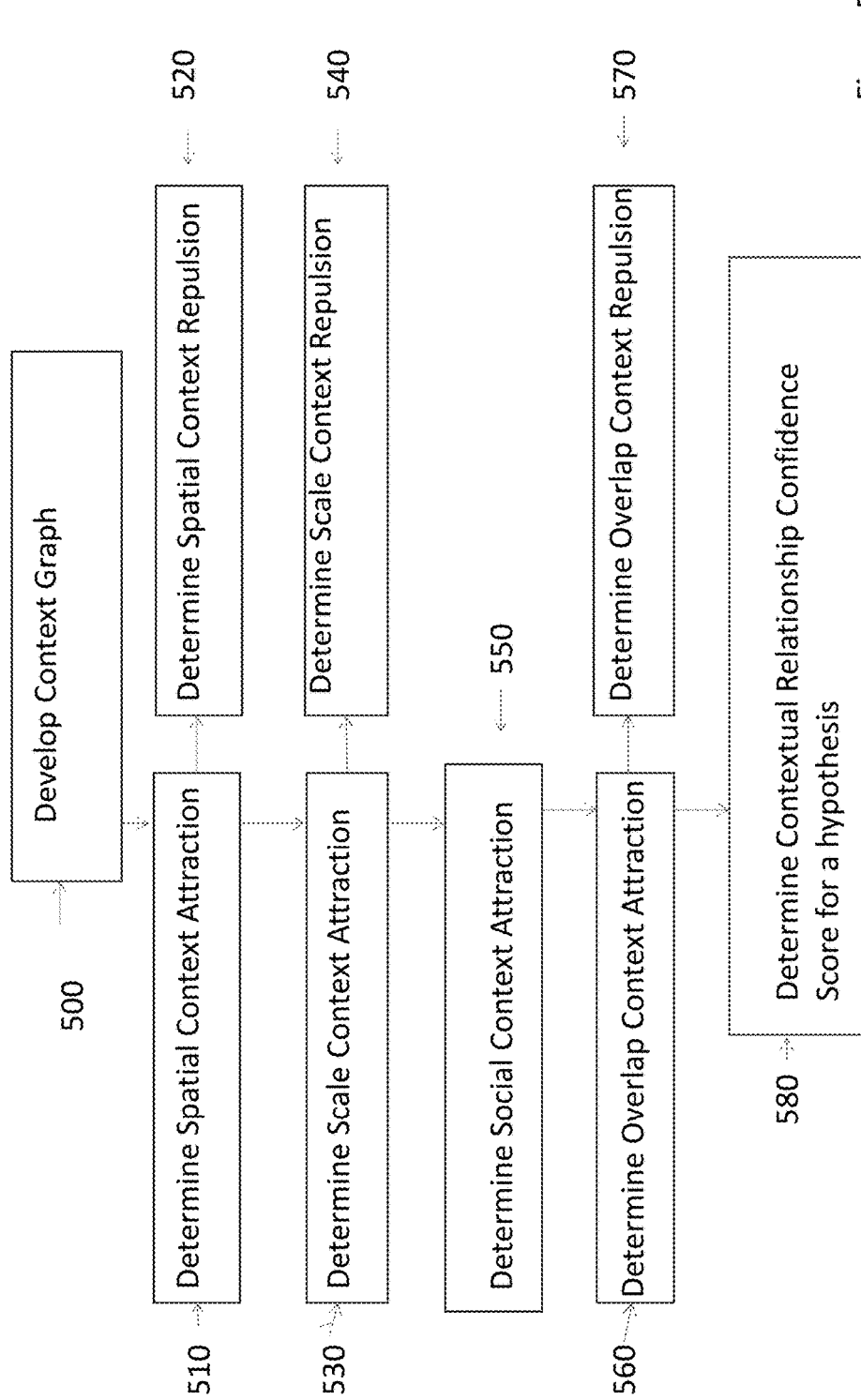
FIG. 5 is a flow diagram of the processing of context information according to one or more embodiments of the present disclosure.

As shown in FIG. 5, the method of developing a context graph 500 is illustrated. For each selected portion, a contextual relationship is undertaken with other selected portions for determining a context confidence value. In the exemplary embodiment, the context confidence value is developed utilizing four distinct contexts. These contexts are as follows: Spatial, Scale, Social and Overlap. Each context has an attraction component and Spatial, Scale and Overlap have a repulsion component. As illustrated in FIG. 5, the Spatial Context Attraction is determined at step 510, and a Spatial Context Repulsion is determined at step 520. The Scale Context Attraction is determined at step 530 and the Scale Context Repulsion is determined at step 540. The Social Context Attraction is determined at step 550. The Overlap Context Attraction is determined at Step 560. The Overlap Context Repulsion is determined at Step 570. These steps are repeated for a particular selected portion with respect to other selected portions previously determined to exist. From the plurality of respective attractions and repulsions a context confidence value is created at step 580.

FIG. 6 illustrates the social context. Each circle represents one selected portion. The arrows illustrate the body or head orientations. Two kinds of social patterns are modeled, following or facing, which is indicated by their respective body or head orientations. As shown in FIG. 6, the orientation of the head of an identified object 700 is compared in relationship with the head of an identified object 710. Due to the orientation, these entities are considered "following" each other. The orientation of the head of an identified object 720 is compared in relationship with the head of an identified object 730. Due to orientation, these entities are considered "facing" each other. The relationship of selected portions 740 and 750 is designated as following as their orientation has them looking at the same area.

Figure 7:
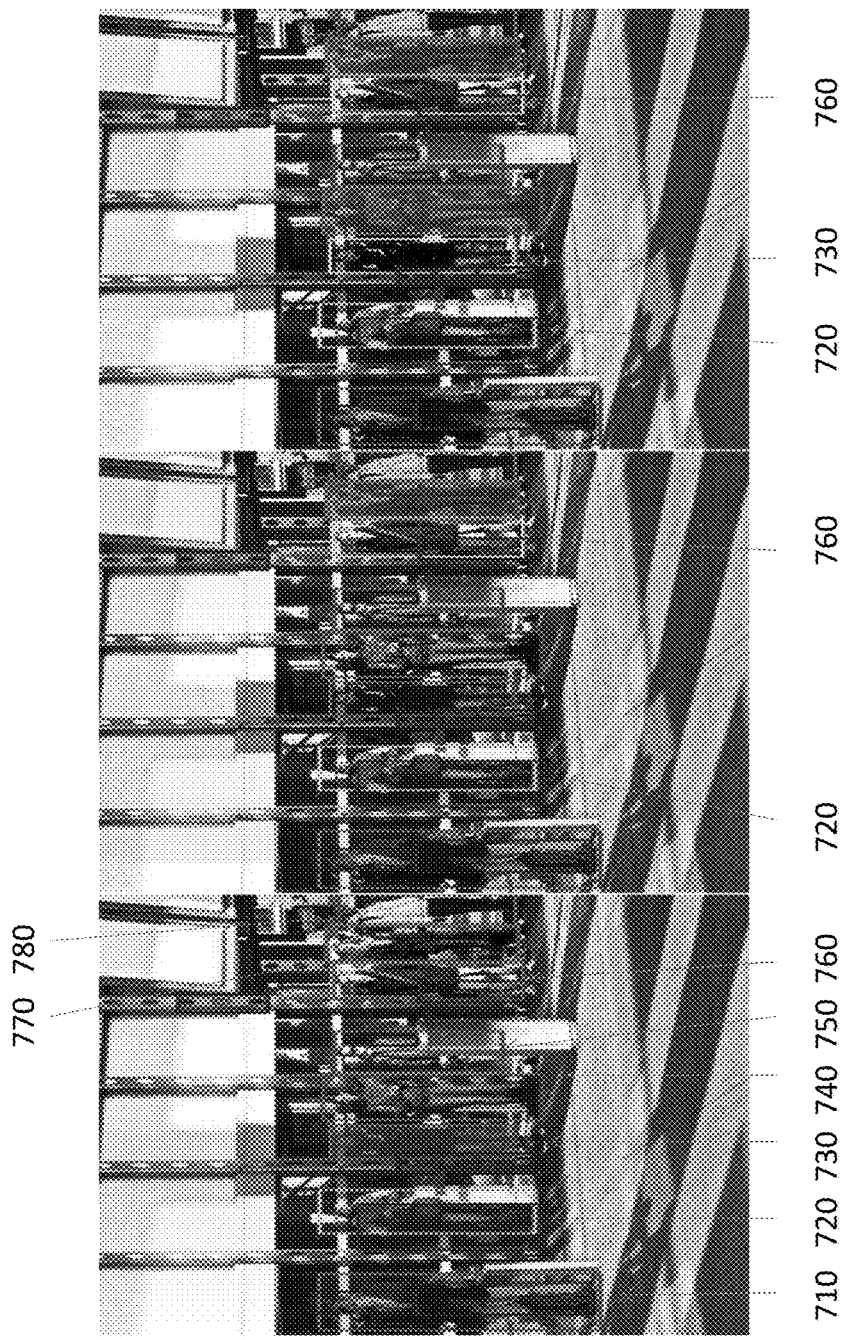
FIGS. 7a, 7b and 7c illustrate multiple iterations of context information for detecting individuals in a crowded scene in accordance with one or more embodiments of the present disclosure.
Figure 8:
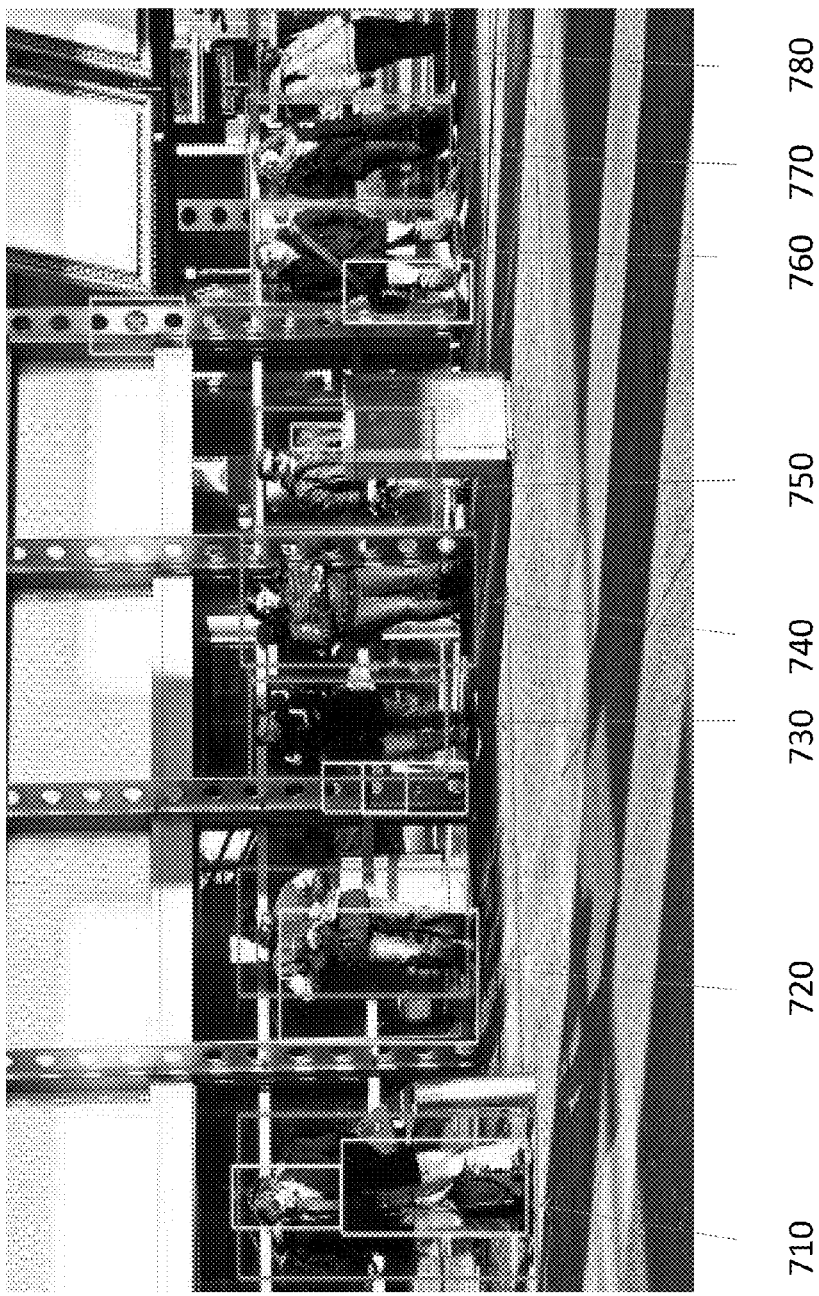
FIG. 8 is an illustration of detections based upon multiple iterations of context information in accordance with one or more embodiments of the present disclosure.

In certain circumstances FIG. 7 illustrates the label propagation with respect to the contexts of individuals. As shown in FIG. 7, several iterations of determining the respective context attractions and repulsions are conducted in order to build the context graph. In the exemplary embodiment provided, as shown in FIG. 7*a*, an initial image is processed a first time to depict several selected portions 710-780. Of these selected portions, selected portion 720 is the clearest image of an individual and receives a high initial confidence value that the object is an individual. Utilizing 720 as a high confidence node, a second iteration of the contexts is conducted in FIG. 7*b*. As shown in FIG. 7*b*, based on the contexts, selected portion 760 receives a high context confidence value and is also identified as an individual. A third context iteration is conducted and with the high confidence of individuals 720 and 760, selected portion 730 receives a high context confidence factor and is identified as an individual. From these respective individual nodes, the remaining selected portions 710, 740, 750, 770 and 780 are also evaluated with respect to each other in propagating a context graph. As shown in FIG. 8, the selected portions 710 through 780 are each identified as an individual whereas many of these selected portions were not clearly representative of an individual from the initial image shown in FIG. 7*a*.

As can be seen from the detailed description and accompanying drawings, one or more embodiments of the present disclosure provide technical effects and benefits, which include identifying with confidence individuals from initial selected portions by utilizing context based post processing techniques on opaque images which typically are not identified utilizing standard image processing procedures. By utilizing post processing techniques utilizing context based clues, more individuals may be identified in certain situations where previously such individuals would be discounted. The increase in individual identification has benefits in areas such as autonomous vehicle environments for detecting potential individuals in the path of the vehicle, and in crowd surveillance for identifying individuals who may be attempting to hide their presence, or in situations where individuals exhibit unusually social behavior. Embodiment of the present disclosure may be implemented as a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method for detecting one or more entities in a scene, the method comprising:
   receiving, using a processor system, image data representing objects of a predetermined area;
   making an initial determination, using the processor system, that selected portions of the image data represent the one or more entities of a selected class by:
     determining and assigning an initial confidence value to a first portion of the selected portions of the image data utilizing facial recognition attributes,
     determining a context confidence value of the first portion of the selected portions of the image data, and
     determining the first portion of the selected portions of the image data represents a first entity of the one or more entities of the selected class utilizing the context confidence value and the initial confidence value, the first entity being an individual; and
   comparing the first portion of the selected portions of the image data to a second portion selected portion of image data via a spatial context and via a social context, the spatial distance identifies a calculated distance between the first and second portions of the selected portions of the image data, the social context measures a relationship of pose and body orientations between the first and second portions of the selected portions of the image data to determine if either of the first and second portions of the selected portions of the image data are facing or following each other, the spatial and social contexts including an attraction component and a repulsion component.

* * * * *